Oct. 26, 1965  C. E. GOERING  3,213,871
THROTTLE CONTROL LINKAGE
Filed Sept. 14, 1961  3 Sheets-Sheet 2

Inventor:
Carroll E. Goering
Paul O. Pippel
Atty.

Oct. 26, 1965  C. E. GOERING  3,213,871
THROTTLE CONTROL LINKAGE
Filed Sept. 14, 1961  3 Sheets-Sheet 3
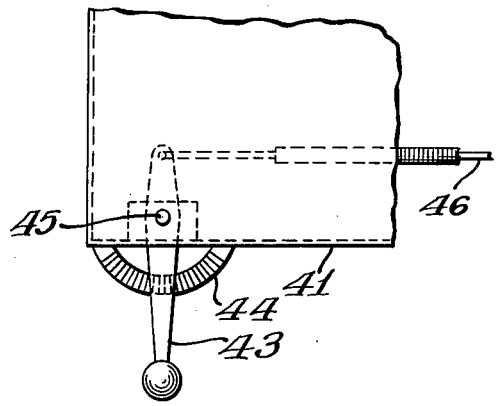
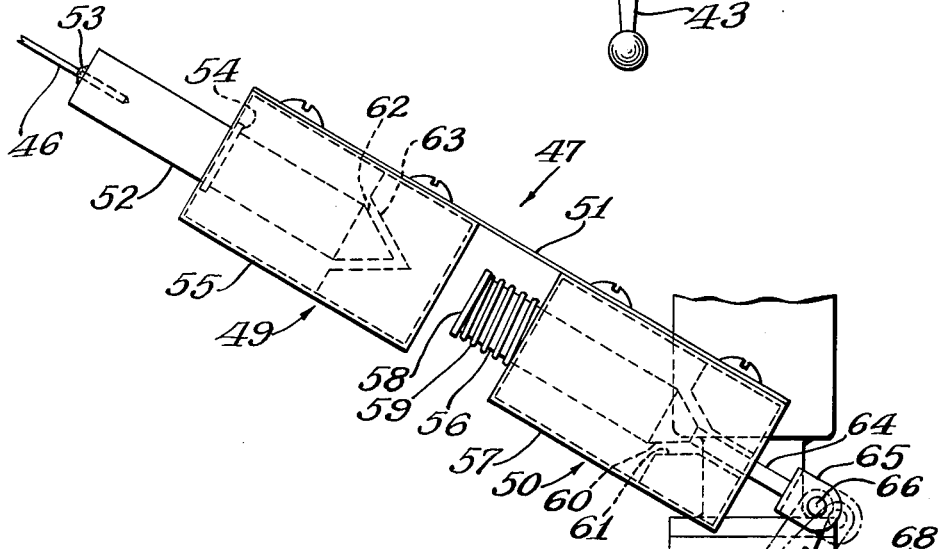
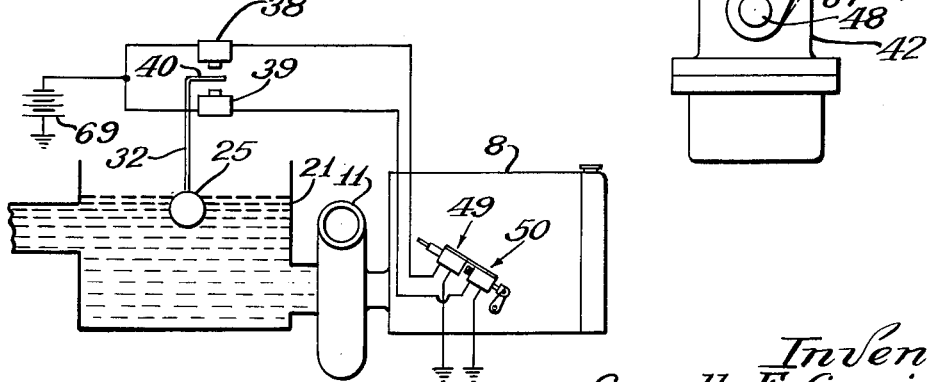
Inventor:
Carroll E. Goering
Atty.

12 # United States Patent Office 3,213,871
Patented Oct. 26, 1965

3,213,871
THROTTLE CONTROL LINKAGE
Carroll E. Goering, Ames, Iowa, assignor to International Harvester Company, Chicago, Ill., a corporation of New Jersey
Filed Sept. 14, 1961, Ser. No. 138,152
8 Claims. (Cl. 137—18)

This invention pertains generally to the control of pumps and, more particularly, to regulating the speed of pumps, thereby coordinating the rates of intake and discharge thereof.

In an irrigation system utilizing self-propelled irrigation apparatus having a plastic hose leading to a source pumping unit at the edge of the field, it is essential that the rate of intake of the pump on said apparatus be substantially equal to the rate of delivery of the water to the apparatus through the hose line. Otherwise spillage of large quantities of water will occur on the one hand when the delivery rate exceeds the pump intake rate; and cavitation of the pump will occur on the other hand when the delivery rate is less than the pump intake rate. Although the delivery rate of the source pump at the edge of the field can be controlled within predetermined limits, such control is not adequate to provide the necessary balance between the water delivery rate and the apparatus pump intake rate. This inadequacy is due largely to the greatly varying length of the delivery hose between the apparatus and the edge of the field as the self-propelled apparatus moves therein. Change in length of the supply hose from several thousand yards to only a few yards drastically alters its internal resistance to the flow of water and consequently the head against which the source pump operates. Further, the hose is usually laid and the apparatus operated over uneven or non-level terrain, which further varies the head against which the source pump works as the irrigation apparatus moves.

It is accordingly the primary object of the invention to provide means for automatically and closely regulating the rate of intake of a discharge pump to substantially equal the rate of delivery of the water thereto from a source pump under varying operating conditions.

Another object of the invention is to provide means whereby the speed of the pump on an irrigation apparatus and consequently the intake rate thereof can first be set manually to substantially equal the rate of delivery of water to the apparatus, which means thereafter automatically regulates or adjusts the speed of the pump and intake rate thereof as necessary to correct for an increase or decrease in the rate of water supply to the apparatus during the course of operation thereof.

A further object of this invention is to provide sensing means incorporating float operated control means as an integral part thereof so as to provide selective control impulses in response to variations in an external fluid level.

An additional object of this invention is to provide linkage means for adjusting the throttle setting of a self-propelled irrigation apparatus which includes extensible and contractible solenoid means as an integral part thereof selectively operable in response to variations in the conditions under which water is delivered to the apparatus.

Other objects, advantages and features of the invention will appear upon proceeding with the specification read in conjunction with the accompanying drawings, in which:

FIGURE 4 is an enlarged elevational view of the solenoid control link of the invention;

FIGURE 5 is an enlarged exterior view taken on line 5—5 of FIGURE 1; and

FIGURE 6 is a schematic view of the apparatus pumping unit including the wiring diagram.

Figure 1:
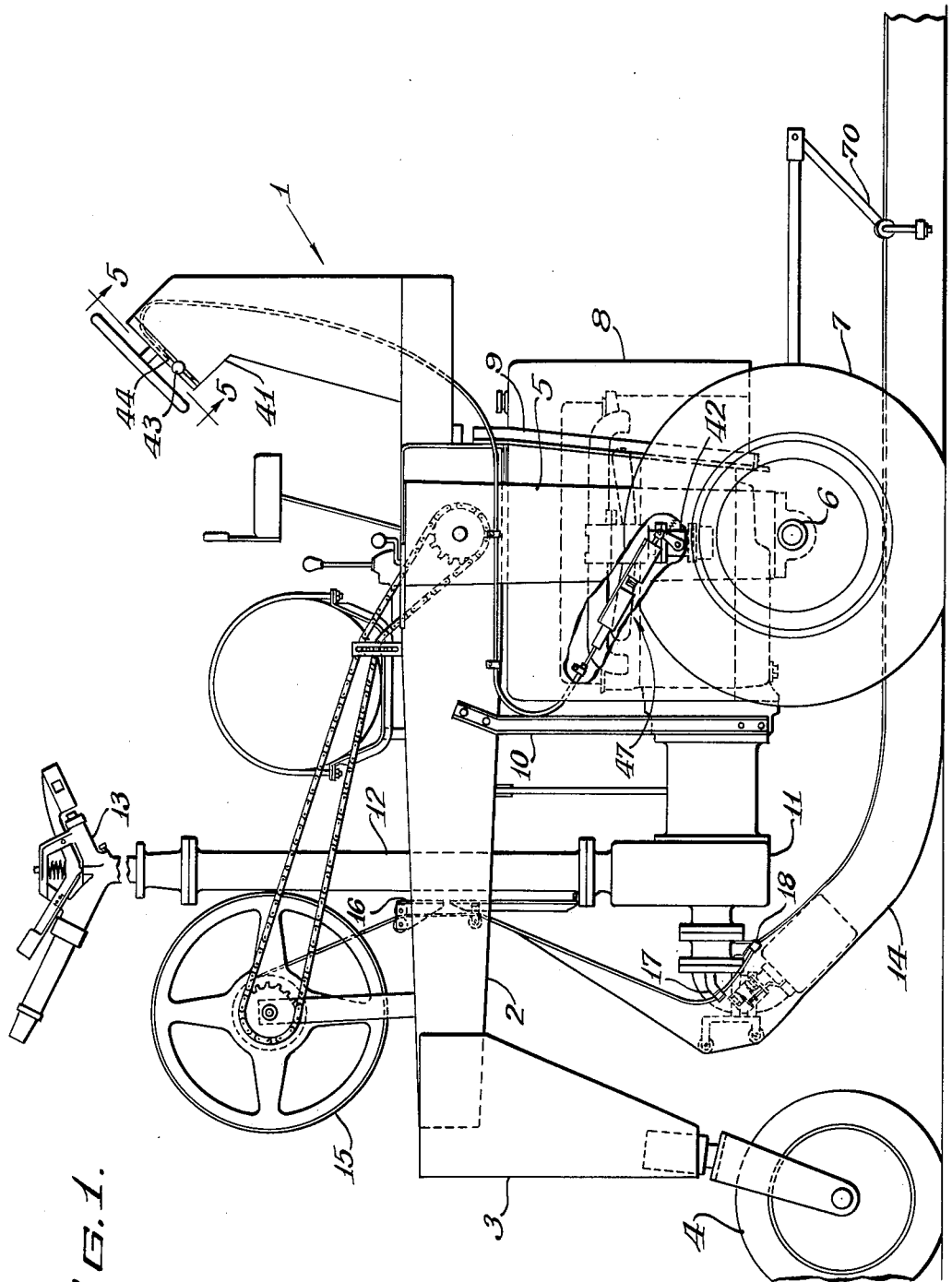
FIGURE 1 is a side elevational view of a self-propelled irrigation apparatus embodying a preferred form of the present invention.

Referring to FIGURE 1 of the drawings in detail, the reference numeral 1 generally designates a self-propelled irrigation apparatus comprising a frame structure of A-frame form having a pair of side rail channel members 2 being joined at the rear by a downwardly depending member 3 to which a rear steerable wheel 4 is suitably mounted. A pair of vertical channel members 5 extending downwardly from the side rail members 2 support a transverse axle 6 by means of suitable journals. Upon this axle 6 are mounted a pair of front drive wheels 7.

A gasoline engine 8 is supported at the front and rear by pairs of hanger members 9 and 10 extending from the frame structure. A pump 11 is driven by the engine, the discharge side of the pump being connected to an upstanding pipe 12 on which is mounted a joint rotatable sprinkler head 13.

The intake side of the pump 11 extends downwardly and forwardly into the plastic conduit 14. This conduit, which is disclosed in U.S. Patent No. 2,974,876, is carried flat on the reel 15 and is unwound and formed by the guides 16 and 17 and the zipper 18 as a unit in synchronization with propulsion of the entire apparatus. In addition, reel 15 may be reciprocated in order to prevent undue building up of marginal portions of the conduit 14 during winding.

Figure 2:
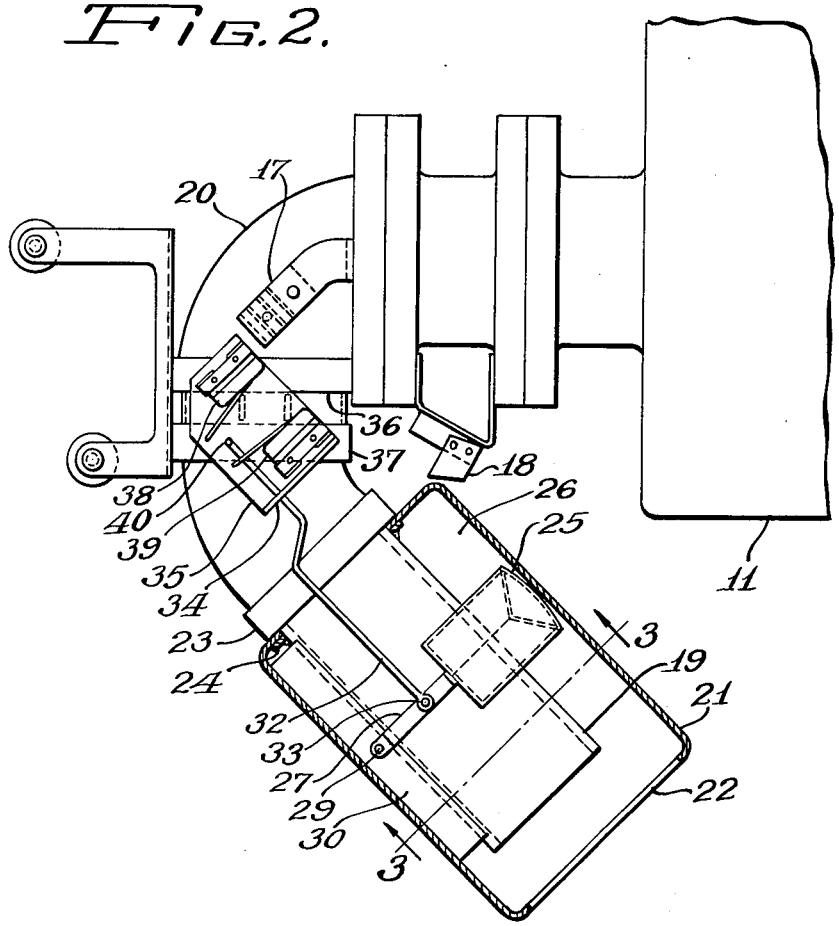
FIGURE 2 is an enlarged fragmentary elevational view partly in section showing the inlet portion of the irrigation apparatus with the plastic hose being omitted for convenience of illustration.
Figure 3:
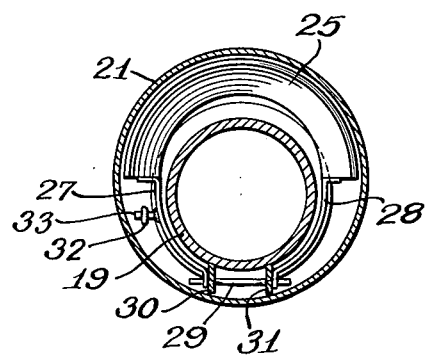
FIGURE 3 is a cross-sectional view taken on lines 3—3 of FIGURE 2.

Proceeding more specifically with the present invention, and as will be clearly seen in FIGURES 2 and 3, the suction or intake pipe 19 threaded within the elbow 20 carries an imperforate housing 21 having an open forward end 22 for receiving the supply of water, housing 21 being held in place against the nut 23 of the elbow 20 by means of an annular flange 24 welded to the suction pipe 19. It is important to note that the axis of the housing 21 is offset substantially upwardly from the axis of the suction pipe 19. Condition sensing apparatus, such as for example a hollow V-shaped float member 25 is contained within the upper section of the chamber 26 formed between suction pipe 19 and housing 21. A substantial amount of clearance is provided between the float 25 and the suction pipe 19 when the float member is in the intermediate position as shown in the drawings in order to allow the V shape of the float to provide for the maximum swinging movement thereof in either direction. The float is further of annular form extending approximately 180° equally on both sides of the longitudinal vertical plane through the housing 21 and suction pipe 19 when the irrigation unit is on level ground, as clearly shown in FIGURE 3.

The float is mounted for pivotal movement by a pair of curved arms 27 and 28 secured to the bottom of the float and extending around the major portion of the lower part of the suction pipe 19. The entire float assembly is pivotally connected by means of the pin 29 to a pair of spaced, upwardly extending members 30 and 31 welded to the lower portion of the housing member 21. A link or tripping arm 32 is pivotally connected to arm 27 by means of a pin 33. This arm 32 extends through an aperture in an outstanding flange 34 of a switch mounting plate 35 which is suitably and adjustably mounted between the flanges 36 and 37 on the elbow 20. A pair of microswitches 38 and 39 are mounted on the plate 35, being tripped in turn by the outturned end 40 of the arm 32 upon predetermined movement of the float 25 with the rise and fall of the water level within the housing member 21.

The control means as will be clearly seen in FIGURES 1, 4, and 5 extends from the dash or operating position 41 of the irrigation unit to controllable means, which for example may take the form of the throttle 42 of the engine 8. This control means comprises a hand control lever 43 mounted on the operating position 41 of the irrigation unit and having a toothed sector for engagement with a suitable toothed guide 44 for retaining the former in any desired manually selected position thereof. The control lever 43 is suitably pivotally supported by pin means 45, the opposite end of lever 43 being connected to a push-pull cable 46 which is secured to the engine cover for connection to the adjustable linkage means 47 forming a principal part of the present invention. The linkage means 47 is in turn connected through arm 67 to the shaft 48 on which the butterfly valve of the carburetor is mounted.

The linkage means 47 comprises a pair of solenoids generally designated 49 and 50, the outer casings of which are rigidly connected together by means of a strap 51 by siutable means as shown. The push-pull cable 46 is suitably connected to the plunger or core 52 of the solenoid 49 as by being received therewithin and locked in place by jam nut 53. An annular stop collar 54 is received within an annular groove within the core member 52. Collar 54 predeterminately limits the downward movement of the section 55 of the solenoid 49 containing the winding or coil thereof. The plunger or core 56 of the lower solenoid 50 extends upwardly beyond the outer section 57 of the solenoid and terminates in a projecting flange 58 between which and the outer section 57 a compression coil spring 59 is received. The normal position of the core 56 of the solenoid 50 is that shown in FIGURE 4 of the drawings in which the coil spring 59 is in a fully extended, unstressed condition placing the lower conical portion 60 of the core in a predetermined spaced-apart relation from the conical seat portion 61 of the outer section 57 of the solenoid. The conical terminal portion 62 of the upper solenoid 49 is spaced from the conical seat 63 of the outer section 55 of that solenoid a distance equal to the spacing between the conical portion 60 and seat 61 of the lower solenoid 50 in the normal unenergized conditions of the solenoids shown in FIGURE 4. The core 56 of the lower solenoid includes a stem 64 extending forwardly and downwardly through an aperture in the solenoid and is suitably connected as by threading to a connecting member 65. Member 65 is in turn pivotally connected by means of the pin 66 to an arm 67 which is keyed or otherwise fixedly attached to the shaft 48 connected to the ordinary carburetor butterfly valve. A light tension spring 68 suitably secured between the arm 67 and a fixed part of the engine or accessories tends to move the arm 67 and connected butterfly valve in a clockwise direction as seen in FIGURE 4 for the purpose of normally biasing the throttle toward a closed position. The coil spring 59 opposes the light spring 68 to place the throttle in a predetermined condition.

Turning now to FIGURE 6, it will be seen that one terminal of the microswitch 38 is connected to one end of the winding of the solenoid 49, the other end of the winding being connected to ground. Similarly, one terminal of the microswitch 39 is likewise connected to one end of the winding of the solenoid 50, the other end of this winding also being grounded. The other terminals of both microswitches 38 and 39 are connected to the battery 69 and thence to ground.

As previously indicated, the plastic hose 14 extends from the irrigation apparatus to the edge of the field, being connected to a source pumping unit located at the main water line. Also as indicated, the output of the source pump can be controlled within certain limits. But due to the greatly variable length of plastic hose 14 as the irrigation unit moves from the far end of the field to a shutoff position close to the source pump, a difference in the internal resistance of the plastic delivery line is encountered. Further, because of uneven terrain and/or grades over which the plastic line is laid, it is impossible to insure a constant delivery rate of water to the irrigation unit by means of controlling the source pumping unit alone. Additional controlling means is therefore essential, which means is provided by the present invention.

In operation, the operator drives the irrigation unit to a starting position adjacent the opposite end of the field from a water main, forming and laying the plastic pipe 14 behind him as he does so. He then shifts his controls for sprinkler propulsion and driving movement of the unit. With the hand control 43 he sets the desired operating position of throttle 42, thereby selecting the desired speed of the engine 8 and consequently an intake and delivery rate for the pump 11. He locks the lever 43 in this selected position. He then steps off of the unit, allowing it to move along the pipeline 14, being guided by the guide means 70 which straddles the pipeline and conveys any curve or lateral undulations of the pipeline to the steerable wheel 4 for causing the unit to follow along the line of the pipe. This is accomplished by means of intermediate linkage and valve means which includes a followup arrangement. The self-steering structure does not form part of the present invention, but forms the subject matter of copending application Serial No. 138,151, filed September 14, 1961, now Patent No. 3,175,769, to which attention is invited. It is pointed out, however, that manually controllable clutch means are provided for allowing the operator to set the steering arrangement for automatic self-steering or, alternatively, to place the same in condition for control by a steering wheel in the cab of the unit when the operator is stationed thereon.

Proceeding further with the operation of the unit, as the rate of the water received within the housing 21, and consequently within the inlet pipe 19, begins to exceed the pumping rate of the pump 11, the water level rises within the chamber 26 and causes the float to rise with it and move in a counterclockwise direction about the pivot pin 29. The link or tripping arm 32 moves upwardly with the float until a predetermined amount of movement of the float occurs, whereupon the outturned portion 40 of the arm 32 engages the tripping element of the microswitch 38 causing tripping thereof and closing of the electrical circuit energizing solenoid 49. Such energization causes the portion of the solenoid link comprising the outer portion 55 of the solenoid 49, the strap 51, and the entire lower solenoid 50 together with the stem 64 to move upwardly and to the left as seen in FIGURE 4 until the conical surface 63 of the upper solenoid abuts against the conical surface 62 of the plunger or core 52, whereupon the movement ceases. Such action contracts or shortens the overall length of the linkage 47, thus rotating the shaft 48 and throttle butterfly valve in a counterclockwise direction as seen in FIGURE 4. This further opens the throttle a predetermined amount, unless the hand adjustment controlled by lever 43 is such as to set the throttle in its fully open condition. Movement of the throttle in the direction of or into the fully opened position causes the engine 8 to increase its speed and consequently the pump 11 to increase its pumping rate. Such increased pumping rate continues until the water in the chamber 26 falls an amount sufficient to allow movement of the float 25 toward the lower position for removal of the tripping end 40 of the member 32 from engagement with the microswitch 38, whereupon the circuit controlled by the latter is broken and the solenoid 49 is deenergized. Upon the latter occurring, the portion of the solenoid linkage excluding the core 52 moves downwardly and to the right as shown in FIGURE 4 under the action of gravity together with the relatively light spring 68 to return the throttle to the previous position corresponding to the position set by the hand control 43. The engine 8 and the pump 11 accordingly return to their former or selected speed.

On the other hand, when the rate of supply of water to the housing 21 and the inlet pipe 19 of the pump 11 is less than the pumping rate of the latter pump, the water level within the chamber 26 falls, causing the float 25 also to fall or move in a clockwise direction as seen in FIGURE 4. Consequently, the link 32 moves downwardly and trips the microswitch 39 upon a predetermined downward movement of the float 25, completing a circuit through the lower solenoid 50, energizing the latter. Such energization causes downward movement of the core member 56 together with its stem 64 against the action of the spring 59, which is compressed. Core 56 continues to move until its conical surface 60 abuts against the conical surface 61 of the outer portion 57 of the lower solenoid 50. It should be noted that the stop collar 54 around the core 52 of the upper solenoid 49 prevents downward movement of the rest of the solenoid linkage and allows, in effect, an extension or lengthening thereof by an amount represented by the longitudinal distance between the surfaces 60 and 61. Such movement of the core 56 and stem 64 rotates the shaft 48 and attached throttle in a clockwise direction to move the throttle a predetermined amount in the closing direction, unless the speed set by hand control 43 is such as to move the throttle into the fully idled condition thereof. The engine 8 and pump 11 are consequently caused to reduce their speed and pumping capacity, respectively, thus allowing the water level in the chamber 26 to rise. Upon sufficient correction of the water level, the arm 32 is moved upwardly sufficiently to allow the microswitch 39 to break its associated circuit, whereupon the solenoid 50 returns to its original unenergized condition shown in FIGURE 4 under the action of the spring 59. Such return also returns the engine speed and pump speed to the initial hand set value as in the case when the upper solenoid 49 was deenergized. It should be pointed out that the amount of throttle movement either in the direction of increased or decreased engine and pump speed is sufficient to more than exceed the amount that the supply rate of the water to the irrigation apparatus either exceeds or is less than the pumping rate of the pump 11, thus compensating for any discrepancy between the rate of supply of the water to the irrigation unit and the rate of intake of the pump 11.

The present device is able to adjust or control the speed and the pumping rate of the pump 11 within relatively narrow limits so as to substantially equal the rate of delivery of the water to the suction or intake pipe 19 at all times regardless of the position of the irrigation unit relative to the source pump and main line and also regardless of the unevenness of the terrain over which the plastic pipe 14 is laid and over which the irrigation device travels. This, of course, precludes spillage and wastage of large amounts of water which is of great importance, particularly in areas where irrigation is necessary and water is at a premium. It also prevents cavitation and loss of priming as a result of an insufficient amount of water at the intake, which would render the irrigation unit inoperative until repriming was accomplished.

It is important to point out that the hand control may at any time be changed to set a new operating speed which will be substantially maintained in the automatic manner herein set forth. The hand control also may be used simply to override any corrections made by either of the solenoids. Hand control of the engine and pump speed, therefore, is always present over the automatic control where desired or necessary to be used.

Although the present invention has been embodied in a self-propelled irrigation unit, the same may also be used in a stationary pumping unit powered by an internal combustion engine having a reservoir or chamber containing a float for tripping the two microswitches and into which reservoir chamber water is supplied which may vary as to its rate of supply. Although a gasoline engine has been disclosed, the power for operating the pump may be a diesel engine or other prime mover, if desired, the present device being inoperative to change the speed of said prime mover in any appropriate way. The solenoid link of this invention has been used in connection with controlling the speed and consequently the pumping rate of a pumping unit; however, the same may have other wider uses wherein a solid link is desired which is predeterminately and alternately or optionally extended and contracted upon the closing of a pair of switches respectively controlled by movement of some member in either of two directions.

The foregoing detailed description is therefore merely illustrative and not intended to limit the present invention in its various aspects, and the appended claims should accordingly be construed and limited only by their own terms read in the overall broad light of the invention in its various aspects.

What is claimed is:

1. In an assembly for use in adjusting a control mechanism, the combination comprising: controllable means; control means for setting an operating position of said controllable means; adjustable linkage means connecting said controllable means and said controlling means; said linkage means including a pair of interconnected solenoids as an integral part thereof having housing elements and movable core elements; one of said core elements being connected to said controllable means and the other of said core elements being connected to said controlling means; and means operatively connected with said linkage means for selectively actuating said solenoids in response to the sensing of at least one condition so as to adjust said controllable means relative to said controlling means; said actuating means including means for sensing said condition.

2. The invention according to claim 1, said condition sensing means comprising float means for sensing a fluid level; and electrical circuit means operated by said float means for energizing said actuating means.

3. The invention according to claim 1, said condition sensing means comprising fluid flow rate sensing means; and electrical circuit means operated by said rate sensing means for energizing said actuating means.

4. In an assembly for use in adjusting the throttle setting of an engine automatically in response to an external condition; a movable arm adapted to be connected to the throttle for controlling its position; means operatively connected with said arm for biasing said arm in a direction adapted to close the throttle; means for setting said arm in a predetermined position so as to provide a given throttle setting; linkage means connecting said arm and said setting means; said linkage means including a strap, a pair of solenoids rigidly mounted on said strap in axial alignment, each of said solenoids having an axially slidable core element, one of said core elements being connected to said arm, means operatively connected with said one core element for biasing said one core element relative to its associated solenoid in a direction adapted to open the throttle, the other of said core elements being connected to said setting means; and means operatively connected with said linkage means for selectively actuating said solenoids in response to the external condition so as to vary the axial dimensions of said linkage means thereby adjusting the setting of the throttle.

5. In combination: vehicle means having throttle controlled engine driven pump means for distributing fluid delivered from a remote source; means for sensing the amount of fluid available to said pump means from said remote source; means for setting said throttle so as to regulate the distribution of fluid by said pump means; and means for automatically adjusting the setting of said throttle in response to said sensing means so as to coordinate the distribution of fluid from said pump means with the delivery of fluid to said pump means; said sensing means comprising a float housing, a float mounted for movement between first and second positions within said housing and having a contact arm extending therefrom exteriorly of said housing, first and second microswitches mounted exteriorly of said housing and adapted to be tripped by said contact arm when said float assumes said first and second positions, respectively; said adjusting means comprising movable linkage connecting said throttle and said throttle setting means and including as an integral part thereof first and second interconnected solenoids having first and second slidable core elements, respectively, said first core element being connected to said throttle setting means, said second core element being connected to said throttle, and circuit means interconnecting said first and second microswitches and said first and second solenoids for selectively energizing said solenoids in response to tripping of said microswitches so as to vary the size of said linkage in order to adjust the setting of said throttle.

6. In an assembly for use in adjusting a control mechanism, the combination comprising: control means; movable controllable means; adjustable linkage means including a strap and a pair of solenoids rigidly mounted on said strap, each of said solenoids having a slidable core element; one of said core elements being connected with said control means and the other of said core elements being connected with said movable controllable means; and means operatively connected with said linkage means for selectively actuating said solenoids so as to vary at least one dimension of said linkage means thereby effecting movement of said movable controllable means relative to said control means.

7. The invention according to claim 6, said control means comprising means for varying said dimension of said linkage means irrespective of selective actuation of said solenoids.

8. The invention according to claim 6, said solenoids being oriented axially with respect to said strap, said control means including manually operable means for varying the axial length of said linkage means irrespective of selective actuation of said solenoids.

References Cited by the Examiner
UNITED STATES PATENTS

| | | | |
|---|---|---|---|
| 437,673 | 10/90 | Bell et al. | |
| 795,346 | 7/05 | Ferguson | 103—14 |
| 914,094 | 3/09 | Whalen. | |
| 1,348,016 | 7/20 | Lee | 137—97 |
| 1,419,925 | 6/22 | Heine | 239—177 |
| 1,562,508 | 11/25 | Johnson | 103—14 |
| 2,188,704 | 1/40 | Claytor. | |
| 2,225,206 | 12/40 | Cassels | 137—18 X |
| 2,236,145 | 3/41 | Kolb | 180—82.1 X |
| 2,265,524 | 12/41 | Fruth | 180—82.1 X |
| 2,268,079 | 12/41 | McKay et al. | 239—146 |
| 2,685,871 | 8/54 | Block | 123—102 |
| 2,924,234 | 2/60 | Wilson | 137—292 |
| 2,974,876 | 3/61 | Poyner et al. | 239—183 |
| 3,091,397 | 5/63 | Wynstra | 239—183 |
| 3,099,254 | 7/63 | Kerr | 123—102 |

ISADOR WEIL, *Primary Examiner.*

ROBERT A. O'LEARY, EVERETT W. KIRBY, *Examiners.*